United States Patent [19]

Morris

[11] Patent Number: 4,738,865

[45] Date of Patent: * Apr. 19, 1988

[54] COATING ADHESIVE

[75] Inventor: Charles A. Morris, Brooklyn Park, Minn.

[73] Assignee: Ogilvie Mills, Inc., Minnetonka, Minn.

[*] Notice: The portion of the term of this patent subsequent to Feb. 26, 2002 has been disclaimed.

[21] Appl. No.: 22,517

[22] Filed: Mar. 9, 1987

Related U.S. Application Data

[63] Continuation of Ser. No. 686,319, Dec. 26, 1984, abandoned.

[51] Int. Cl.$^4$ .............................................. A23L 1/09
[52] U.S. Cl. ..................................... 426/658; 426/103
[58] Field of Search .................. 426/93, 89, 103, 270, 426/272, 289, 293, 296, 309, 632

[56] References Cited

U.S. PATENT DOCUMENTS

| | | | |
|---|---|---|---|
| 2,693,420 | 11/1954 | Straub | 426/658 |
| 3,063,843 | 11/1962 | Hashimoto | 426/93 |
| 3,103,439 | 9/1963 | Williams | 426/658 |
| 3,314,800 | 4/1967 | Nozneck | 426/93 |
| 3,740,236 | 6/1973 | Baxley | 426/309 |
| 3,833,413 | 9/1974 | Glabe et al. | 426/459 |
| 4,053,650 | 10/1977 | Chino et al. | 426/93 |
| 4,161,545 | 7/1979 | Green et al. | 426/93 |
| 4,308,289 | 12/1981 | Huisman et al. | 426/93 |
| 4,501,758 | 2/1985 | Morris | 426/293 |

Primary Examiner—Raymond N. Jones
Assistant Examiner—Carolyn Paden
Attorney, Agent, or Firm—Fisher, Christen & Sabol

[57] ABSTRACT

An adhesive for adhering flavoring agents to foodstuffs comprising a mixture of a reducing sugar, preferably lactose, and a maltodextrin. The adhesive is particularly useful for coating peanuts with a dry honey coating providing honey coated and salted nuts. Various other foodstuffs including fruits and vegetables may be coated using this adhesive.

7 Claims, No Drawings

COATING ADHESIVE

This application is a continuation of application Ser. No. 686,319, filed Dec. 26, 1984, now abandoned.

This invention relates to the coating of foodstuffs and in particular to an adhesive to which a large variety of flavoring substances can adhere to provide a flavored foodstuff.

BACKGROUND OF THE INVENTION

Snack foods are becoming of more and more significance. A large number of snack foods are being flavored with a variety of flavoring agents including salt, herbs and spices. Peanuts, as well as other nut meats, are one particular foodstuff popular today, and salt is one of the most popular flavoring agents. Recently, honey coated and roasted nuts are popular. Honey coated, or other sugar coatings, are desirable on a large variety of foodstuffs including fruits and various confectionery products as well as nut meats, such as sunflower seeds, nuts such as pecans, almonds, and the like.

In my copending U.S. application, Ser. No. 497,335, filed May 23, 1983, honey coated nuts are dealt with. While the adhesive disclosed therein is particularly adapted to that application or use, it has now been found that such adhesive finds utility not only with honey coatings but also coatings of flavoring agents in general and more importantly is useful in applying coating to food bases or foodstuff other than peanuts and nut meats.

A good summary of various food bases such as nuts and confectionery flavoring agents such as molasses, honey and the like can be found in the description of prior art practices of my copending application noted above, which disclosure is incorporated herein by reference. Further, U.S. Pat. No. 3,740,236 discloses the use of an aqueous dextrin solution as a binder. U.S. Pat. No. 3,314,800 discloses a vital wheat gluten binder.

SUMMARY OF THE INVENTION

The present invention is directed to a tack adhesive which can be applied to a food base to which a flavoring agent or substance is to be applied. This adhesive provides a tacky coating to which the flavoring agent particles can adhere and which will maintain its integrity during subsequent processing such as drying or roasting, or other handling, such as packaging and shipping.

It has been found that a mixture of a reducing sugar (such as lactose, fructose or dextrose) preferably lactose, and maltodextrin provide a particularly useful tack adhesive to which flavoring agents will adhere. This adhesive can be applied out of an aqueous solution to any foodstuff or food base material which is not adversely affected by water, i.e. is water tolerant, and to which a flavoring substance is directed to be applied. In my copending application, the adhesive is applied to peanuts. However, the adhesive can be applied to other food base materials such as soybeans, peas, tree nuts, sunflower seeds, pumpkin seeds, and dried fruits or vegetables.

DETAILED DESCRIPTION OF THE INVENTION

As noted earlier, the adhesive of this invention is a mixture of reducing sugar and maltodextrin. In the adhesive the ratio of maltodextrin to reducing sugar is in the range of about 5:1–20:1, preferably about 6:1–10:1. The mixture is applied from an aqueous mixture of the components, the aqueous mixture generally containing from about 35–65% weight water and preferably 45–55%. The aqueous mixture is applied to the foodstuff base material in an amount of about 1–8 parts aqueous mixture to 100 parts by weight of foodstuff base, and preferably about 2–6 parts.

The foodstuff base is preferably a nut such as almonds, peanuts, cashews, pecans, filberts, brazil nuts, walnuts and other edible nuts. However, any foodstuff desired to be coated with a flavoring agent and not adversely affected by water may be employed. Such foodstuffs would include dried or dehydrated foods such as fruits and vegetables, including but not limited to pineapples, bananas, apples, cranberries, strawberries, blueberries, tomatoes, beets, peppers and carrots.

The coating of the food base material is generally conducted in any mechanism which presents mixing and coating of the food base material with an aqueous mixture of the adhesive. Rotating pans or revolving drums with baffles are conveniently employed. After the adhesive is applied to provide an even coating, the flavoring agent is applied. The solid, finely divided, or powdered flavoring agent can be dusted on to the food base material coated with the adhesive which has sufficient tack to retain the flavoring agent adhered thereto. The substantially dry flavoring agent may be of a wide variety including spices and herbs, salt, pepper, various cheeses and the like. The particular flavoring agent will depend on the nature of the food base material to be coated. In the case of peanuts, honey roasted coatings are particularly desirable, such as described in my copending application noted earlier. As noted therein, the flavoring agent second mixture comprised of a sugar, a starch and dried honey is employed. The mixture is preferably from about 55% to about 85% by weight of the sugar, from about 7% to about 20% by weight of the starch, and from about 7% to about 20% by weight of the dried honey. The sugar is typically sucrose, although other sources of sugar may also be employed.

The starch employed at this point in the invention is preferably prime grade wheat starch. Alternatively, other starches may be utilized including potato starch, dextrines which are a hydrolyzed starch, corn starch, tapioca starch or modified food starches.

A suggested source of dried honey utilized in the present invention is described in U.S. Pat. Nos. 2,693,420 issued Nov. 2, 1954 to Straub and 3,833,413 issued Sept. 3, 1974 to Glabe et al., which are herein incorporated by reference. Essentially the product described in the aforementioned patents is from about 20% to about 75% of honey, from about 10% to about 80% by weight starch, preferably wheat, from about 0% to about 50% by weight of a sugar source, from about 0% to about 3% by weight calcium stearate, from about 0% to about 5% soy protein, and from 0% to about 2% of hydroxylated lecithin. The moisture content of a dried honey is in the range of less than 5% by weight of the honey, preferably less than 3% by weight, most preferably 1.5% to 2.8% by weight. The honey is preferably completely utilized at step (b), however, small amounts may be included at (a).

The mixture of sugar, starch and dried honey is dusted onto the nuts which have been treated with the mixture of the sugar and carbohydrate containing adhesive. The level of usage of the mixture of starch, dried honey and sugar is at from about 5 parts to about 20 parts, preferably from about 8 parts to about 15 parts per 100 parts of the dry untreated nuts. The honey is employed such that half or more of a panel of untrained tasters would recognize a honey flavor after being informed of the honey content. The dusting is accomplished by any convenient means and may be conducted in a batch operation using the same rotating pan which was used to apply the solution of sugar and adhesive to the nuts. The term dusting means that the mixture is substantially dry or at least does not have a liquid honey character.

After the nuts have been dusted with the mixture of starch, sugar and dried honey, the coated nuts are roasted (cooked) according to the art practices. The roasting may be accomplished using a hot oil bath, preferably using an oil which does not affect the taste of the nuts. Alternatively, it has become fashionable to roast nuts in an oven so that no additional oil pick-up occurs. The roasting temperature is not critical and for convenience may be between 145° C. and 190° C.

The following examples illustrate the present invention in which all parts and percentages are by weight unless otherwise noted. Peanuts are used in the examples for illustration, however, other food base materials or edible foodstuffs may be employed. When roasting of the product is not desired or needed for such other foodstuffs, the product is merely dried and the flavoring agent will adhere and be retained on the food base material.

EXAMPLE I 200 parts of raw shelled peanuts are added to a revolving drum containing baffles to ensure adequate mixing of the nuts. The drum operated at 30 revolutions per minute.

7.5 parts of an aqueous mixture containing 3.2% by weight lactose and 38.5% by weight maltodextrine is added to the rotating nuts. This mixture is added slowly until the nuts are evenly coated.

A mixture of 24.5 parts which is 78% sucrose, 12% wheat starch and 10% of a previously dried honey is prepared. The dried honey has the approximate composition of 31 parts starch and 66 parts honey solids. The peanuts are tumbled until they are evenly coated with the mixture of starch, sugar and the previously dried honey.

The coated nuts are then roasted in peanut oil at 170° C. for 3.5 minutes. The roasted coated nuts are then air cooled for 2 to 3 minutes and lightly dusted with 4 parts of a mixture which is 80% sucrose and 20% table salt.

EXAMPLE II 200 parts of raw peanuts are obtained as described in Example I. 7.5 parts of an aqueous mixture containing 5% by weight sweet whey and 31.3% by weight maltodextrine (Maltron M-100) is slowly added until the nuts are evenly coated.

A mixture of 24.5 parts of the starch, sugar and dried honey mixture described in Example I is slowly added to the tumbling nuts. The process is continued until the nuts are evenly coated.

The coated nuts are cooked in peanut oil at 171° C. for a period of 3.5 minutes followed by air cooling for 2 to 3 minutes and a dusting as described in Example I.

The nuts obtained in this Example are highly flavorful when compared to nuts manufactured utilizing liquid honey. This Example may be varied by substituting in sequential order, almonds, cashews, pecans, filberts, brazil nuts and walnuts in place of the peanuts. It is also possible due to the consistent nature of the process of the present invention to coat mixed nuts from the aforementioned group. This last mentioned process allows an even coating of the nuts without a substantial dry mixing of the nuts which can become broken or damaged if the mixing is done on the coated nuts.

EXAMPLE III 200 parts of raw peanuts are added to a revolving drum as described in Example I. The drum is operating at 25 revolutions per minute.

7.5 parts of a mixture containing 3.2% by weight lactose and a 38.5% by weight maltodextrine mixture is added to the tumbling nuts. The tumbling is continued until the nuts are evenly coated.

24.5 parts of mixture of starch, sugar and previously dried honey as described in Example I is added to the adhesive coated tumbling peanuts. The particle size of the coating on the nuts is from 0.05 mm to 0.5 mm. The nuts are tumbled until the mixture is evenly coated through limited application of the aforementioned dry mixture.

The nuts are then cooked for 3 to 4 minutes in peanut oil at 171° C. 4.16 parts of a mixture of 80% sucrose and 20% salt is then added to the coated nuts. The nuts described herein are of a golden brown color and present a desirable honey taste.

EXAMPLE IV

A particularly desirable adhesive for use in honey coated nuts employing a dried honey coating on the flavoring agent is

| Lactose | 7.0% |
|---|---|
| Maltodextrin | 39.0% |
| Water | 54.0% |
| | 100.0% |

When dry roasting, 5.5 lbs of solution will coat 100 lbs of raw peanuts. The adhesive solution gives the dry roasted peanut a pleasant brown color when cooked. The normal color for dry roasted peanuts is a pale brown color with the nut looking dry.

With oil roasting, 3.7 lbs of solution will coat 100 lbs of raw peanuts. The adhesive solution increases the browning of the cooked peanut. The adhesive has enough strength to keep the coating on a nut when it is cooked in 340° F. oil.

EXAMPLE A

In this example the adhesive above was employed in an oil roast system using 50 lbs of peanuts or sunflower seeds which are added to the rotating drum. The adhesive solution is added to the rotating nuts in an amount of 1.85 lbs of solution. After the nut or seed foodstuff is evenly coated with the adhesive solution, 6 lbs of the dried honey coating material of Example I is added to the rotating nuts. Afterward the nuts are roasted in 340° F. oil for 4–6 minutes.

EXAMPLE B

In this example, the adhesive solution is employed in a dry roast system following the procedure in Example A above, but adding the adhesive solution at 5.5% by weight of the nuts, the dried honey flavoring material at 12% by weight of the nuts and cooking in a dry roaster at 380–400° F. for 14–15 minutes.

EXAMPLE C

In this example, there is illustrated a variation in which some flavoring agent is found in the adhesive solution. This option is available when the flavoring agent is water soluble, as in the case of the salt employed herein.

| Adhesive solution: | Lactose | 5.9% |
|---|---|---|
| | Maltodextrin | 35.8% |
| | Salt | 8.3% |
| | Water | 50.0% |
| | | 100.0% |

To 200 grams of raw peanuts in a revolving beaker there was added 12 grams of adhesive solution above. After the nuts were evenly coated, 24.5 grams of the dried honey flavoring material was added. After the nuts are coated, they are dry roasted at 400° F. for 14.5 minutes.

What is claimed is:

1. An aqueous solution useful as an adhesive for adhering a flavoring agent to a food-stuff, said aqueous solution comprising water, lactose present in an amount of from 3 to 7 percent by weight and maltodextrin present in an amount of from 31 to 39 percent by weight.

2. An aqueous solution as defined in claim 1 wherein said solution comprises by weight 3.2% lactose and 38.5% maltodextrin.

3. An aqueous solution as defined in claim 1 wherein said solution comprises by weight 5% lactose and 31.3% maltodextrin.

4. An aqueous solution as defined in claim 1 wherein said solution comprises by weight 7% lactose and 39% maltodextrin.

5. An aqueous solution as defined in claim 1 wherein said solution comprises by weight about 6% lactose and 36% maltodextrin.

6. An aqueous adhesive composition useful for adhering a flavoring agent to a foodstuff, said adhesive composition consisting essentially of

| Lactose | 5.9% |
|---|---|
| Maltodextrin | 35.8% |
| Salt | 8.3% |
| Water | 50.0% |

7. An aqueous adhesive composition useful for adhering a flavoring agent to a foodstuff, said adhesive composition consisting essentially of

| Lactose | 7.0% |
|---|---|
| Maltodextrin | 39.0% |
| Water | 54.0% |

* * * * *